(No Model.) 2 Sheets—Sheet 1.
O. F. YARBROUGH.
GRAIN PLANTER.
No. 491,459. Patented Feb. 7, 1893.
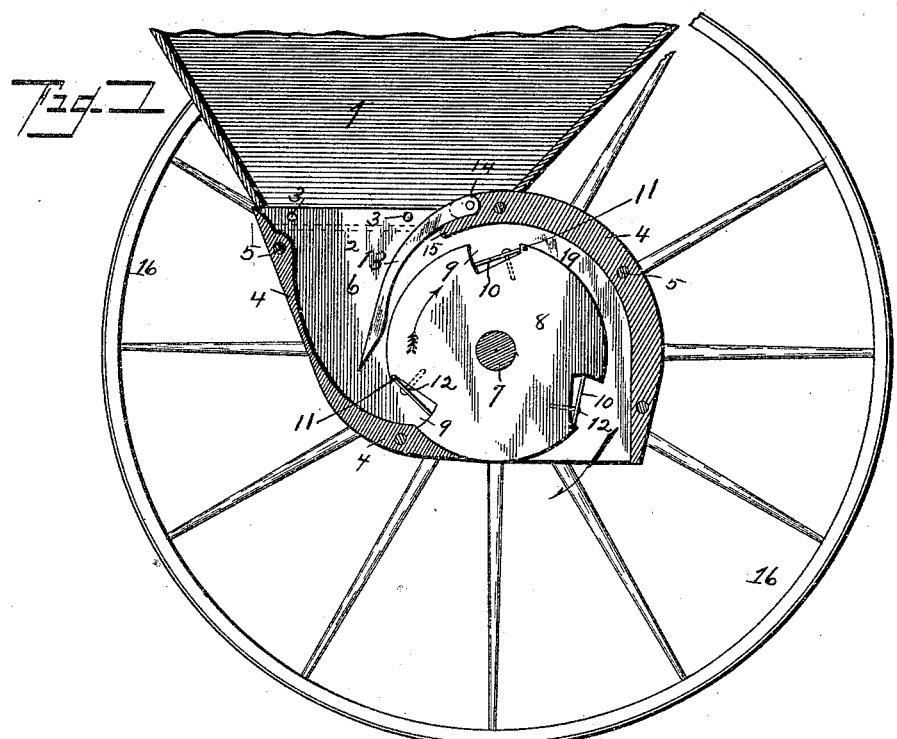
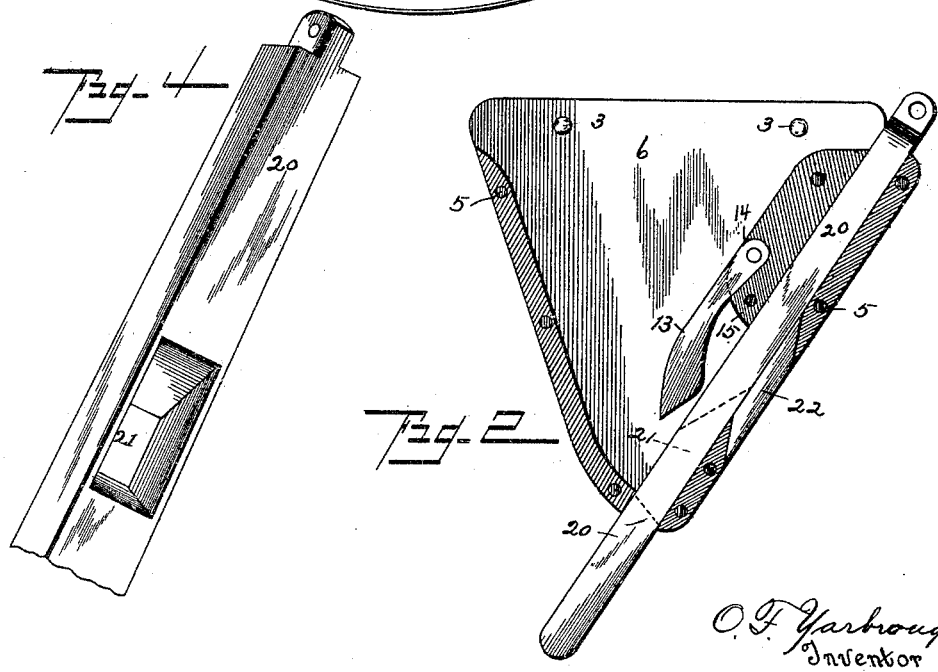

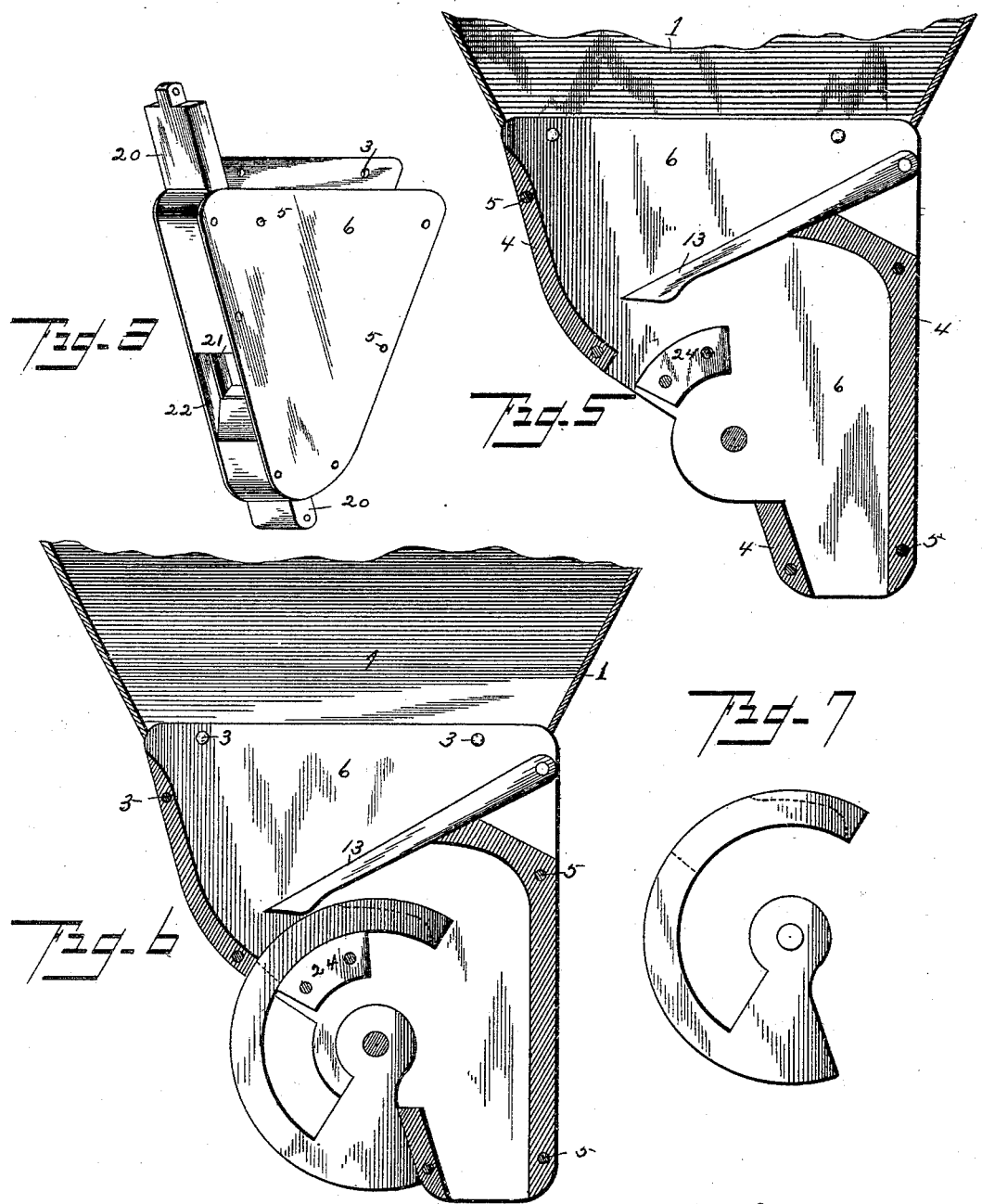

UNITED STATES PATENT OFFICE.

ORCENETH FISHER YARBROUGH, OF DALLAS, TEXAS.

GRAIN-PLANTER.

SPECIFICATION forming part of Letters Patent No. 491,459, dated February 7, 1893.

Application filed June 13, 1892. Serial No. 436,608. (No model.)

*To all whom it may concern:*

Be it known that I, ORCENETH FISHER YARBROUGH, of Dallas, county of Dallas, State of Texas, have invented certain new and useful Improvements in Grain-Planters, of which the following is a full, clear, and exact specification, reference being had to the accompanying drawings.

The object of my invention is to produce a machine for dropping large grain, such, for instance, as corn, or peas, or it may be used for dropping wheat, or the like.

It consists in a certain new construction and arrangement of parts by which the operation is timed perfectly, the grain is properly measured and dropped without any crushing of the particles.

The machine may be manufactured for a small cost and, on account of its simplicity, is durable and not likely to get out of order.

My machine consists essentially of a fixed part provided with a dropping aperture and a movable part provided with a measuring device, adapted to receive a supply of grain from a hopper and to discharge it through the dropping aperture, at proper intervals and in suitable quantities. The movable part may be driven by hand, and may be reciprocating, rotary, or semi-rotary.

Referring to the accompanying drawings: Figure 1 is a side view of one form of my dropper, with one of the sides removed, showing the movable part rotary and adapted to operate continuously and automatically. Fig. 2 is a similar view of a modification of my device, showing a reciprocating, movable part, and: Fig. 3 is a perspective thereof. Fig. 4 is a view of the reciprocating, movable part, detached, and showing the measuring aperture. Fig. 5 is a view similar to that shown in Fig. 1, showing a different modification of my device and the movable part attached. Fig. 6 is a similar view showing the movable part in position. Fig. 7 is a view showing the movable part for the modification last illustrated, detached.

Referring to the figures on the drawings: 1, indicates a suitable hopper that may be carried in any convenient manner, as, for instance, upon a plow-stock, or a wheeled vehicle, or anything of the kind which is not necessary to illustrate in the drawings.

2, indicates the bottom part of the hopper fastened thereto by screws or bolts 3. It consists, preferably of frame pieces 4, to which are fastened by bolts or screws, 5, the side pieces 6. Mounted between the side pieces and carried upon an axle 7, is a wheel or solid cylinder 8, provided with notches 9, in its periphery. One notch may be used, but where close planting is desired a greater number of notches may be employed.

10, indicates a gate in this notch pivoted at 11, and provided with a set screw 12, by which the capacity of the notch, or measuring aperture, (I will call it) may be determined. The arrangement of the parts is such that the gate may be set so as to completely close the aperture, and in this way the distance of planting by my machine may be regulated, whatever be the number of notches in the wheel.

13, indicates a sweeping arm which is pivoted to one part of the frame, at 14, and which falls within a short distance of the periphery of the wheel 8, but is held from contact therewith by the projecting arm or stop 15.

16, indicates a wheel which may be fastened upon a common axle 7, and to which is also, in like manner, secured the wheel 8. The wheel 16, is preferably in contact with the ground, so that by its rotation it also imparts rotation to the wheel 8, and causes it to travel in the direction of the arrow. It will be perceived that between the sides of the frame and the wheel 8, there is a channel 19.

In operation the grain from the hopper is caught up in the measuring aperture in the periphery of the wheel and is carried by it under the feed arm which scrapes off, without crushing, the superfluous amount of grain which is then carried on through the channel 19, and dropped out through the bottom part thereof upon or into the ground. It will be perceived, from this description, that the movable part in this form of my dropper is practically continuous in operation. In Figs. 2, 3, and 4 of the drawings the movable part is shown as reciprocating. The principle of operating in those forms does not differ from that already described. The sweep arm appears as supported upon the frame side. The movable part is a straight bar, 20, which rides in bearings between the sides of the frame pieces. It is provided with a feed aperture 21, which is filled, when the movable part is in its lowest position, with grain and, when it is elevated, the grain is lifted to the discharge aperture 22, and dropped as before. The reciprocating part may be operated by any suitable means, such as a lever, or a connecting bar within easy reach of the attendant. This is designed to be used for planting at variable intervals to suit the will of the operator.

In Figs. 5, 6, and 7 of the drawings is illustrated still a different form of my device, in which the wheel is not allowed to completely rotate, but when it has caught up a suitable amount of grain in its measuring aperture it is rotated until it discharges into the outlet or discharge aperture, when its further rotation is prevented by its coming in contact with a stop lug 24, secured between the sides of the frame.

It will, from the foregoing description, be perceived that my device may be modified in many particulars without departing from the scope of my invention. It is also not only adapted to be used for dropping grain directly upon the ground, but may be mounted upon the feed shaft of a wheat drill, for example, and caused to discharge the grain from the drill hopper into the feed tubes regularly and in a proper manner.

What I claim is:—

The combination with the hopper and hollow receptacle, of a movable part, provided with a feed aperture, and an arm pivoted within a shouldered recess within the hollow recess, and adapted to sweep off the grain during the movement of the movable portion, the bottom of the recess serving as a stop to limit the movement of the arm, substantially as specified.

In testimony of all which I have hereunto subscribed my name.

ORCENETH FISHER YARBROUGH.

Witnesses:
H. W. JONES,
J. H. STAFFORD.